Nov. 15, 1966  R. G. HEATON  3,285,109
HEAVY DUTY AUTOMATIC BRAKING MEANS
Filed May 14, 1964  6 Sheets-Sheet 1

INVENTOR.
ROGER G. HEATON
BY Kenney and Schenk
ATTORNEY

Nov. 15, 1966   R. G. HEATON   3,285,109
HEAVY DUTY AUTOMATIC BRAKING MEANS
Filed May 14, 1964   6 Sheets-Sheet 3

INVENTOR.
ROGER G. HEATON
BY
Kinney and Schenk
ATTORNEY

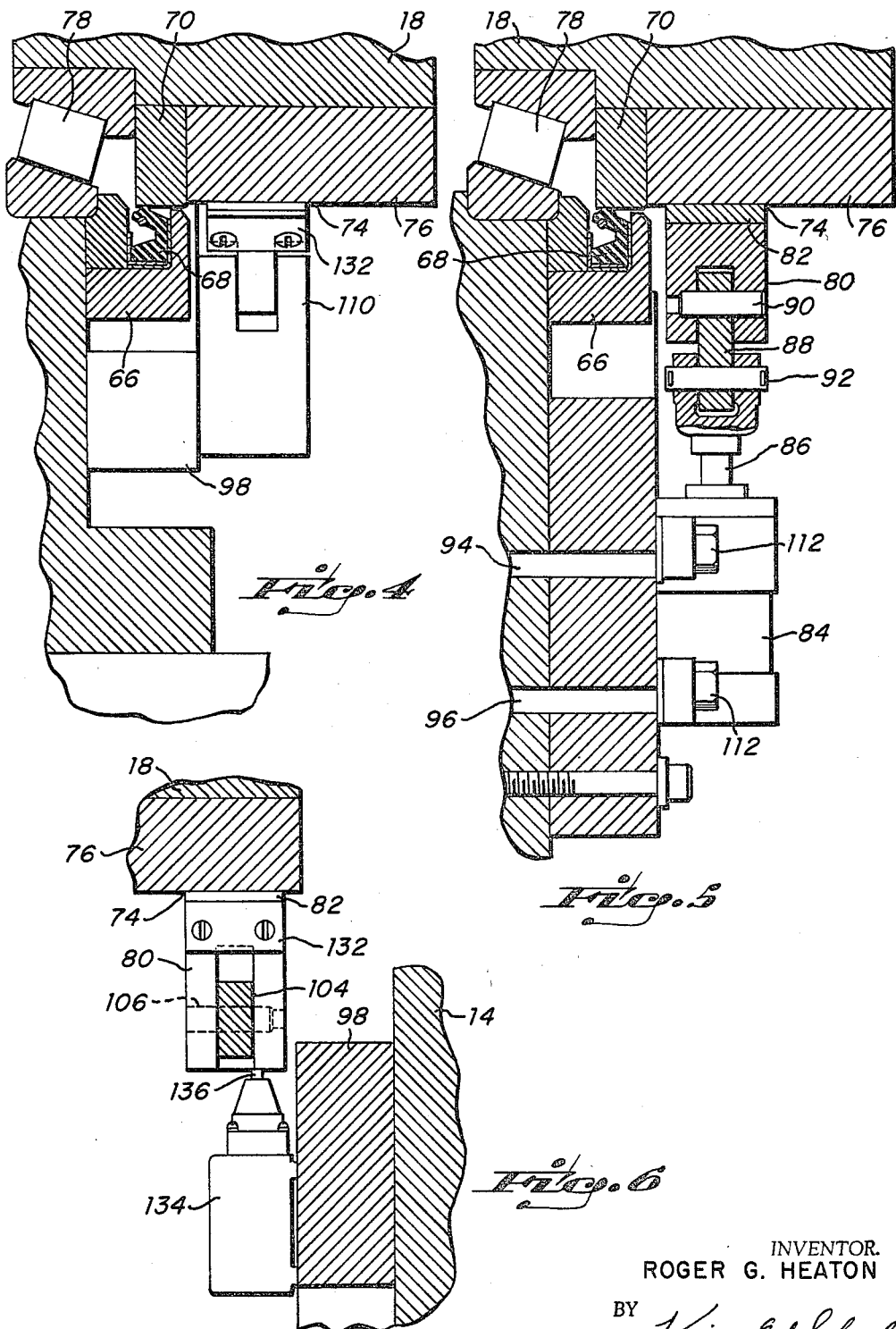

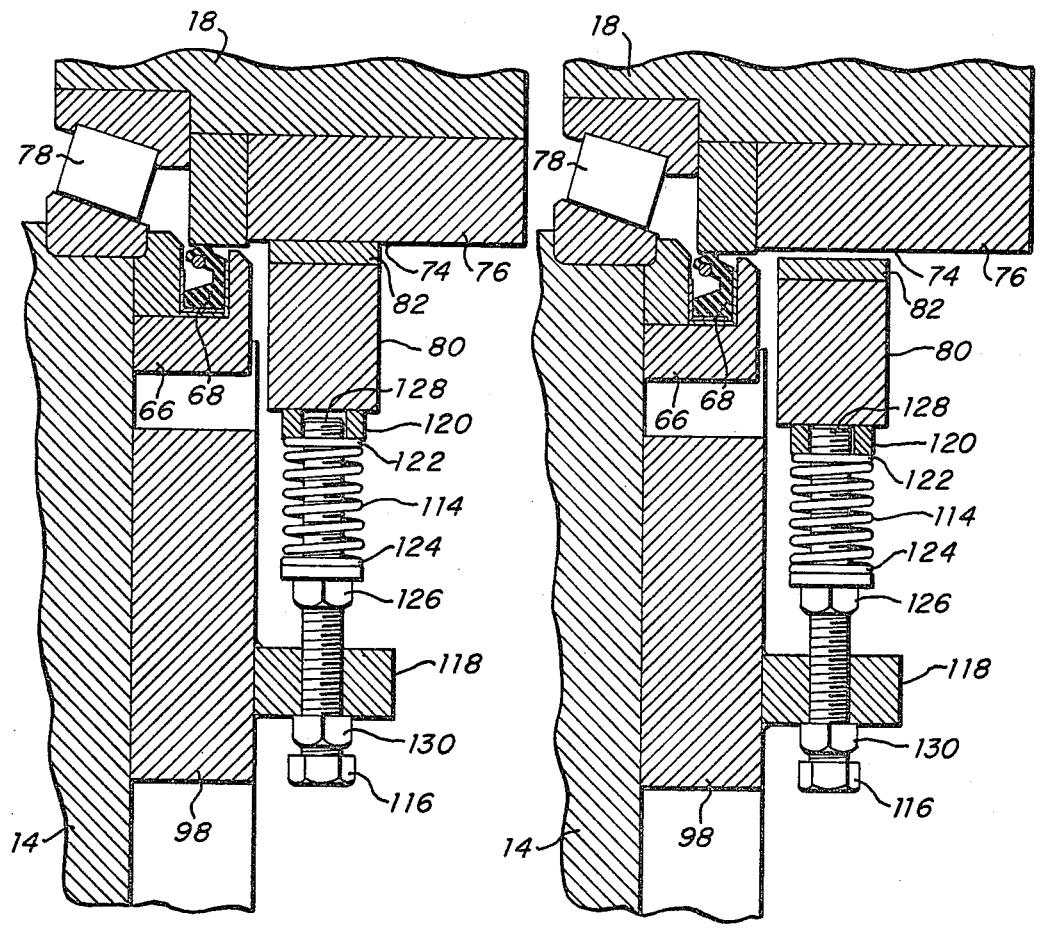

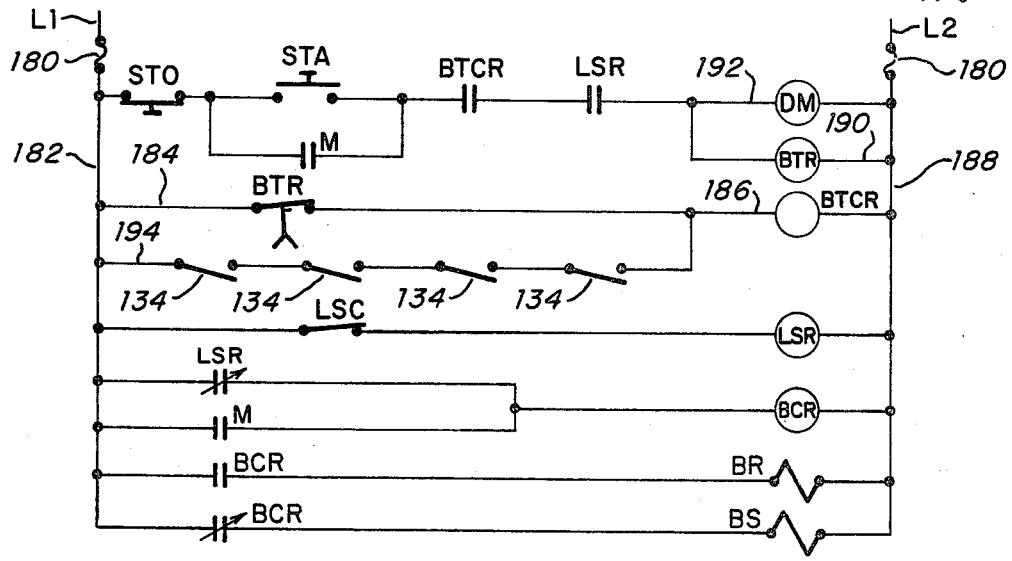
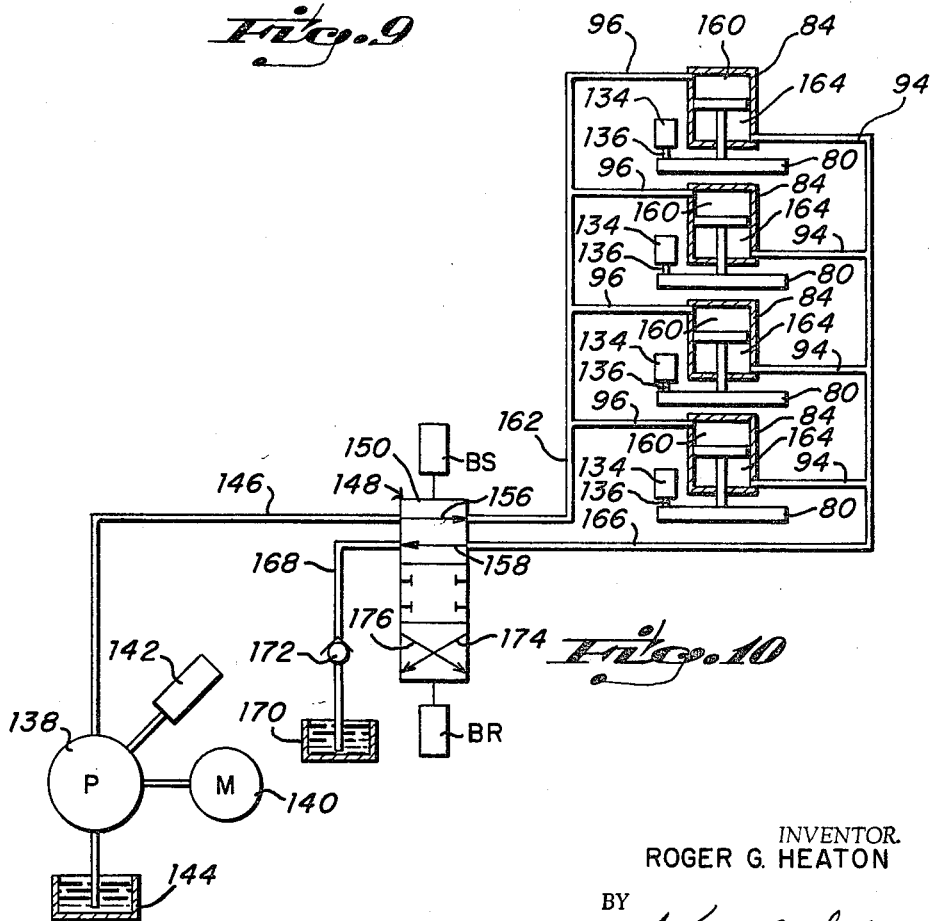

United States Patent Office 3,285,109
Patented Nov. 15, 1966

3,285,109
HEAVY DUTY AUTOMATIC BRAKING MEANS
Roger G. Heaton, Amelia, Ohio, assignor to
Jack N. Binns, Cincinnati, Ohio
Filed May 14, 1964, Ser. No. 367,529
15 Claims. (Cl. 82—28)

The present invention relates to a braking means for the motorized driving member of heavy metal-shaping machinery, and is applicable particularly to very large lathes, boring mills, and kindred shaping equipment.

In the turning of massive mill rolls, heavy wheels and shafts and the like, for example, it is highly desirable that de-energization of the turning machine motor during a turning or shaping operation, be accompanied by a prompt and firm braking of the workpiece rotation, at a location very close to the point of driving of the workpiece. Such braking accordingly may best be applied at the driving spindle or faceplate of the machine, in order to avoid retrogression of the workpiece and consequent loss of tool pressure at the cut being performed thereon. Retention of the cutting pressure of the tool during any temporary pause in the turning operation, is a matter of great importance to the performance of accurate work, and assures also a substantial extension of the life of the cutting edge of the shaping tool.

An object of the present invention is to enhance the quality of the work, and minimize tool deterioration, in the turning and shaping of very heavy workpieces.

Another object of the invention is the accomplishment of the foregoing objective, by incorporating in equipment for turning, a highly efficient and serviceable braking means operative upon the faceplate or spindle of such equipment, concurrently with de-energization of its driving motor.

A further object of the invention is to provide means characterized by great durability and simplicity, for braking and releasing a workpiece driving member automatically during an interruption occurring in the course of a turning and shaping operation.

Another object is to provide means in association with a device of the character stated, for automatically de-activating the turning machine in the event of failure of the braking means to release the workpiece driving member upon re-starting of the driving motor, this being a safety feature of importance.

The foregoing and other objects are attained by the means described herein and illustrated upon the accompanying drawings, in which:

FIG. 4 is a fragmental cross-section taken on line 4—4 of FIG. 3.

FIG. 5 is a cross-sectional view taken on line 5—5 of FIG. 3.

FIG. 6 is a cross-sectional view taken on line 6—6 of FIG. 3.

FIG. 7 is a fragmental cross-section showing the brake in operative condition.

FIG. 8 is a view similar to FIG. 7, showing the brake in inoperative condition.

FIG. 9 is a diagram of an electric circuit such as may be incorporated in the braking system for control thereof.

FIG. 10 is a schematic view showing an hydraulic system forming part of the brake control means.

Figure 1:
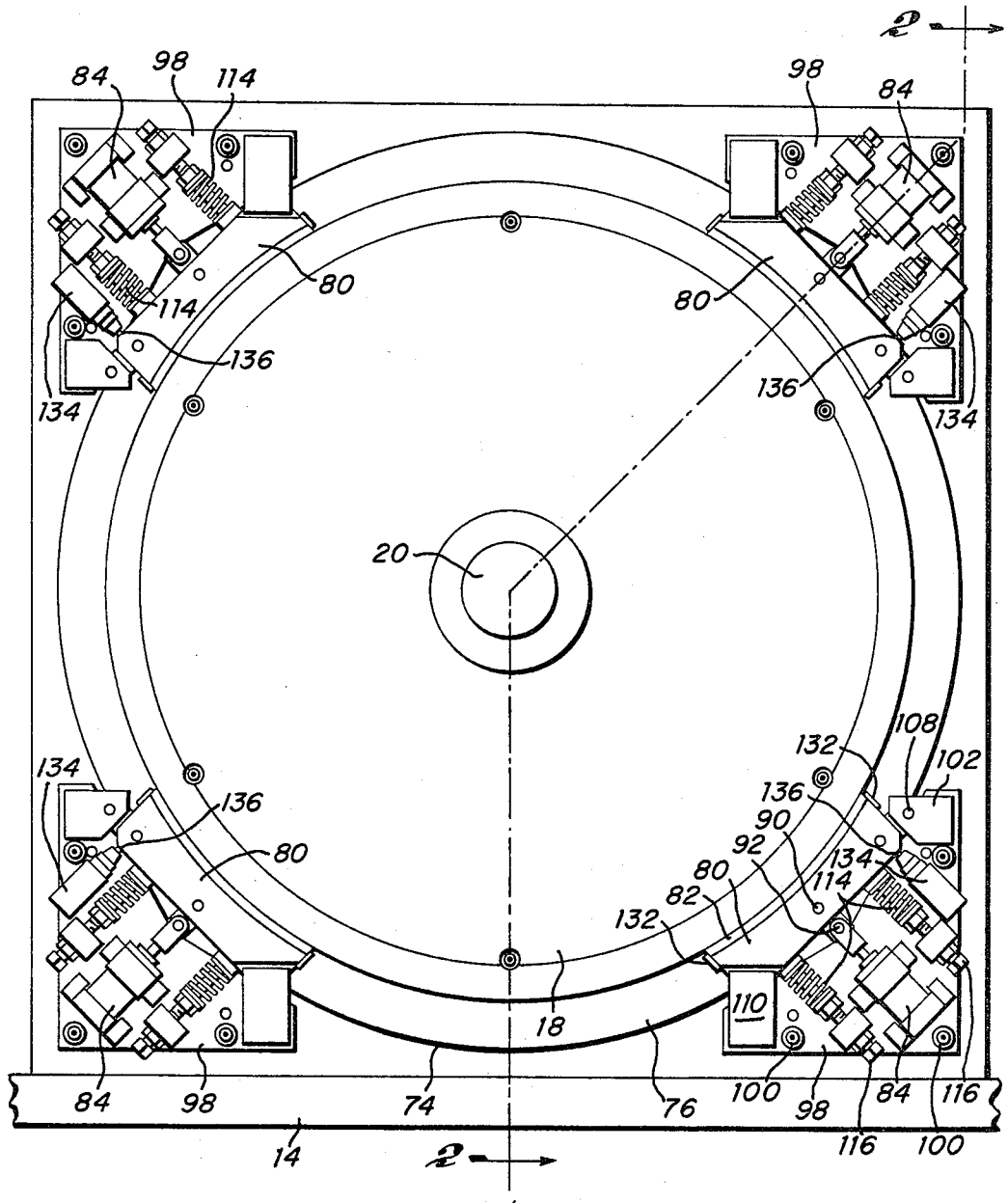
FIG. 1 is a front elevational view of a faceplate and spindle for rotating a workpiece, and incorporating the braking means of the invention.

In the interests of simplicity and clarity of explanation, the invention is herein disclosed as applied to a turning lathe, by way of example, although it may find application to other forms of machine tools for the shaping of heavy workpieces such as rolling mill rolls, large shafts and wheels, and the like, as will become manifest to persons skilled in the art to which the invention apertains.

In the drawings, 14 indicates the head stock of a lathe, which if desired, may house a reducing gear system driven by a power shaft 16 having suitable driving connection with an electric driving motor or other prime mover DM, FIG. 9. A rotary faceplate or spindle member 18, and a center 20, are adapted to support and drive one end of a heavy workpiece which is suitably secured to member 18, utilizing conventional clamping means for the purpose.

In the example illustrated, the reduction gearing for driving the workpiece support member 18 may include a main shaft 22, which is bolted at 24 to a large drive gear 26 in constant mesh with a drive pinion 28 on power shaft 16. A sun gear 30 integral with shaft 22, is in mesh with one or more planet gears 32, which in turn are meshed with an internal ring gear 34. Planet gear 32 is rotatable upon a supporting stud 36, which latter is fixed to the back of workpiece support member 18. Ring gear 34 carries two rows of external splines 48 and 50 peripherally thereof.

A ring-shaped movable clutch member 38 surrounds ring gear 34, and may be shifted axially of shaft 22 by means of a shifter rod 40 to be longitudinally moved selectively in opposite directions, preferably by means of an hydraulic cylinder 42 mounted upon the headstock. Clutch member 38 carries two spaced rows of internal splines 44 and 46. When the clutch member is shifted to the left as in FIG. 2, its splines 44 engage the external splines 52 of a fixed clutch ring 54, the latter being secured as by means of screws 56, to a stationary part 58 of the headstock. At the same time, the splines 46 of the shiftable clutch member move into engagement with the external splines 50 of ring gear 34, thereby locking the ring gear through splines 46–50 and 44–52, to the headstock. Planet gear 32 accordingly will travel along the internal teeth 60 of the locked ring gear 34, to drive member 18 at slow speed.

Figure 2:
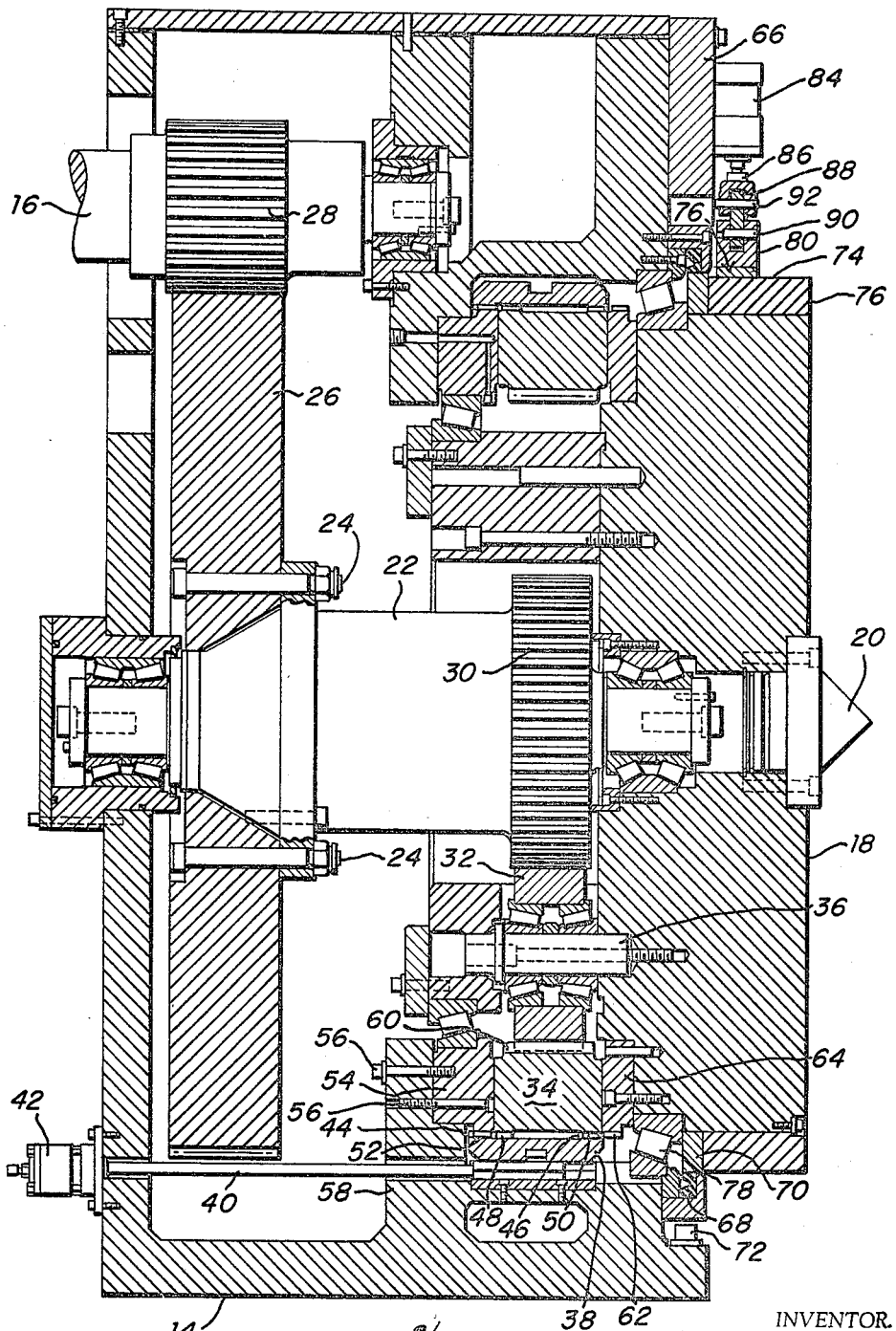
FIG. 2 is an enlarged cross-sectional view taken on line 2—2 of FIG. 1.

To rotate the drive member 18 at fast speed, hydraulic cylinder 42 may be activated to move the shiftable clutch member 38 to the right in FIG. 2, thereby placing its splines 46 in engagement with the external splines 62 of a clutch ring 64 fixed to the back of drive member 18. At the same time, the splines 44 of the shiftable clutch member 38 will leave the splines 52 of clutch ring 54, and engage with the splines 48 of ring gear 34, thereby to effect locking of ring gear 34 to drive member 18, through the spline connections 46–62 and 44–48, for rotating the drive member 18 at fast speed.

With regard to the above described planetary drive, it should be understood that nothing of a patentable nature is claimed herein, and accordingly, any acceptable form of drive gearing may be incorporated in headstock 14 for rotating the workpiece driving member 18 at required rates of speed.

The headstock of the machine may include a stationary front wall 66, to which is applied a sealing ring 68 adapted to bear against a peripheral part 70 fixed on driving member 18, for retaining lubricant within the headstock. The headstock is fixed to the bed of the lathe in customary manner, as by means of bolts 72.

The workpiece driving member 18 is in the form of a circular body, having a peripheral braking surface 74 all points of which are equidistant from the axis of rotation of the driving member. By preference, though not of necessity, a separate drum element 76 may be securely fixed about the perimeter of the driving member body, to furnish the desired braking surface 74. The braking surface may be metallic, and is preferably located at a substantial distance from the axis of rotation of the driving member. The driving member may be supported upon the headstock by means of anti-friction bearings 78 located near brake drum 76.

Figure 3:
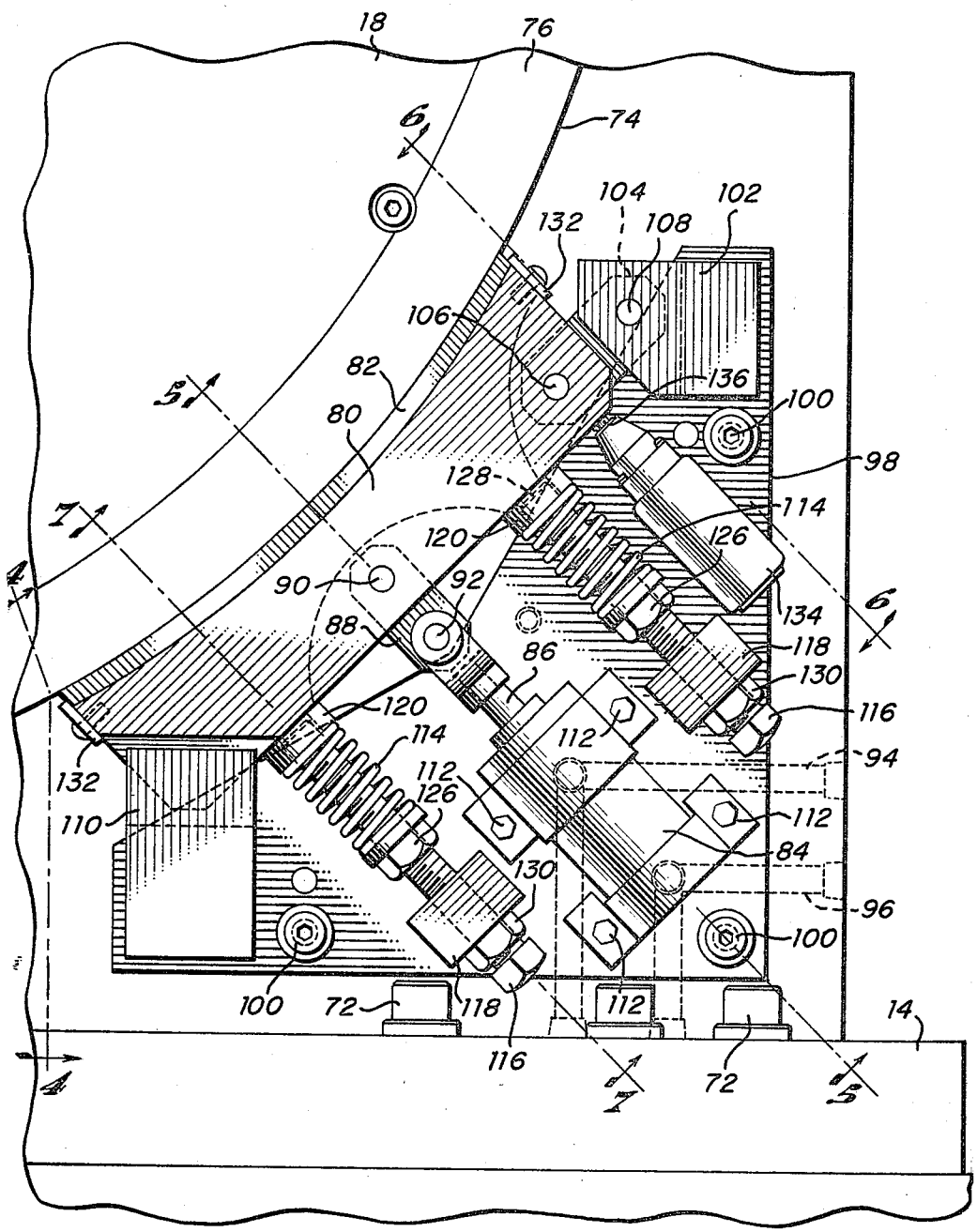
FIG. 3 is an enlarged elevational detail view of the braking mechanism shown at the lower right of FIG. 1.

Referring now to FIG. 3, the numeral 80 indicates an arcuate brake shoe carrying a liner 82 adapted to bear upon the braking surface 74, with each advancement of the shoe. The shoe may be advanced and retracted by means of a double-acting hydraulic cylinder 84, the piston rod 86 of which may be connected to the shoe at its middle by means of a link 88. Link 88 may be pivoted to the shoe at 90, and to the free end of rod 86 at 92. Hydraulic fluid may be fed to the cylinder and exhausted therefrom in alternation, through ports 94 and 96 provided in the front wall 66 of the headstock, so as to selectively advance and retract piston 86. Several brake shoes and cylinders which are identical to one another in all respects, may be disposed in equally spaced relation about the workpiece driver, as suggested by FIG. 1. The hydraulic system for cylinders 84 is such that all the brake shoes engage the brake drum, and all disengage the drum when properly operative.

Cylinders 84 may may be bolted each to a mounting bracket 98, which in turn is fixedly secured at 100 to the stationary front wall of the headstock. A fixed lug 102 on each bracket 98, may have a floating connection with one end of a shoe, as by means of a link 104, to resist movement of the brake shoe with the rotating drum when the shoe engages the drum. Link 104 may be pivoted at 106 and 108 to the shoe and to lug 102, respectively. The opposite end of shoe 80 may be limited in its withdrawal from the brake drum, by a stationary stool 110 carried by bracket 98. The reference characters 112 indicate bolts for securing the hydraulic cylinders to the brackets.

Means are provided for constantly yieldingly urging the brake shoes toward the brake drum, and for limiting withdrawal of the shoes from the drum. Such means may comprise a pair of compression springs 114, and a pair of adjusting screws 116 the shanks of which pass through the springs and project at right angles toward the shoe (FIG. 7). Internally threaded fixed lugs 118 carried by bracket 98, threadedly receive the shanks of screws 116. The threaded end of each screw 116 is loosely received in a bored collar 120 which abuts a shoe, and one end 122 of spring 114 abuts the collar while the opposite end 124 thereof abuts an adjusting nut 126 on the shank of the screw.

When the shoe is advanced by the action of spring 114, FIG. 7, the threaded end 128 of screw 116 is spaced from the back of the shoe as shown. This space may be varied by rotating the screw within lug 118, and locking it in adjusted position by means of a lock nut 130.

The force of springs 114 acting to advance a shoe 80, may be varied by rotating the nuts 126, as is evident by reference to FIG. 7. By activating the hydraulic cylinder 84 to withdraw its piston rod, the shoe 80 will be bodily retracted from brake drum 76 (FIG. 8), to an extent permitted by the ends 128 of screws 116. Upon hydraulic advancement of the piston rod, the shoe will be advanced by hydraulic force as well as by the force of springs 114, as will be understood.

Referring to the elevational views, it is noted that two springs and adjusting screws 116 are associated with each shoe, the screws being equidistant from the axis of reciprocation of the hydraulic cylinder piston rod. Retraction of the piston rod pulls the shoe against the free end 128 of both adjustable stop screws, and holds the shoe out of braking engagement with drum 76 in opposition to the force of compression springs 114.

The numerals 132 indicate clips for holding the brake lining 82 in position upon the brake shoe.

Upon each bracket 98 is fixed a normally open-circuited electric switch 134, preferably of the micro-switch type, having a normally extended contact or button 136 which, upon depression, closes an electric circuit through the switch. Switches 134 are so arranged on the brackets 98, that a brake shoe 80 will depress the contactor 136 and close-circuit the switch so long as the brake shoe is withdrawn from the brake drum 76 by action of its associated hydraulic cylinder 84.

With reference to FIG. 10, which schematically depicts the hydraulic system of the device, the numerals 138 and 140 indicate, respectively, a fluid pump and a pump motor, the pump being equipped with the customary pressure compensator 142. Pump 138 draws hydraulic fluid from a sump or source of supply 144, and delivers it to a pressure line 146 in which is connected a reciprocatory control valve 148, which may be a spool valve, the spool 150 of which may be shifted longitudinally by either of two solenoids BS or BR. Pump 138 maintains a constant pressure of fluid in supply line 146.

Valve spool 150 may include two direct ports 156 and 158, which in one shifted position of the spool, complete a fluid circuit to the rear chambers of all the hydraulic cylinders 84. The path of fluid as indicated by FIG. 10, is from supply line 146, through port 156, through manifold pipe 162 and its associated ports 96, and into the rear chambers 160 of all the cylinders 84. The pressure of fluid maintained within the rear chambers of the cylinders, activates all the cylinder pistons, for maintaining all the brake shoes 90 in operating position upon the brake surface of the workpiece driving member 18.

Any fluid displaced from the forward chambers 164, under the conditions above related, flows through ports 94, a second manifold pipe 166, valve port 158, and return pipe 168, to sump 170. Return pipe 170 may include a one-way ball valve 172 to preclude complete drainage of fluid from the forward chambers of cylinders 84. As will readily be appreciated, sumps 170 and 144 may be one, in practice, and such consolidation of the sumps is preferred.

To release the brakes by withdrawing the shoes 80 from the brake surface of workpiece driving member 18, it is necessary to shift the valve spool for placing the reversing ports 174 and 176 thereof into the position vacated by valve ports 156 and 158, thereby pressurizing the chambers 164 of the several cylinders 84 to reverse the direction of movement of the cylinder piston rods. Fluid under pressure then will flow from supply line 146 through valve port 176, manifold pipe 166, and cylinder ports 94, to cylinder chambers 164. Fluid displaced from chambers 160 will return to the sump through ports 96, manifold pipe 162, valve port 174, and return pipe 168.

FIG. 10 illustrates the relationship of components when the turning machine is at rest. That is, the two direct valve ports 156 and 158 will be in the position shown, to direct fluid under pressure to manifold pipe 162 and the rear chambers of cylinders 84, to ensure braking of shoes 80 against the brake surface of the workpiece driving member or faceplate. At the same time, the springs 114 which constantly urge the shoes to braking position, will apply braking force to the shoes also. The springs 114, moreover, will apply braking force to the shoes, whenever there is a loss of pressure for any reason.

It may here be pointed out that the force of springs 114 is gauged to yield to the force of cylinders 84 expended in retracting the brake shoes, so that whenever control valve 148 is actuated to place its reversing ports 174 and 176 in the fluid circuit of cylinders 84, the power of the cylinders in withdrawing the brake shoes overcomes the expansive force of springs 114. The foregoing statement of course assumes that pump 138 is operating.

In the embodiment of the invention herein disclosed, energization of brake setting solenoid BS disposes valve ports 156 and 158 to the operative position illustrated by FIG. 10. Energization of the brake release solenoid BR moves the reversing ports 174 and 176 of the valve to the operative position vacated by valve ports 156 and 158.

In the wiring diagram of FIG. 9, line wires fused at 180 are indicated by reference characters L1 and L2. Other components of the control circuit are:

DM—the driving motor for the headstock spindle.
M—driving motor starter components.
BTR—brake time relay.
BTCR—brake timer control relay.
BCR—brake control relay.
LSR—clutch limit switch relay.
LSC—limit switch on clutch shifter.
STA—driving motor start switch.
STO—driving motor stop switch.
BS—brake setting solenoid.
BR—brake release solenoid.

Let it be assumed that the headstock driving motor DM is de-energized, and that the hydraulic fluid pump 138 is operating continuously, with control valve 148 directing fluid under pressure through manifold pipe 162, to charge the chambers 160 of the several hydraulic cylinders 84. The brake shoes 80 accordingly will be in braking contact with workpiece driving member or faceplate 18, leaving the several micro-switches 134 in open-circuit condition as indicated upon the diagram, FIG. 9. A workpiece to be turned will be secured to the driving member or faceplate 18, and a shaping tool or cutter (not shown), will be poised in cutting position against the workpiece, in readiness to shape the workpiece upon energization of headstock motor DM.

Momentary depression of starter switch STA, will complete the motor circuit through normally closed brake time relay BTR by way of conductors L1, 182, 184, BTR, 186, BTCR, 188, 190, BTR, 192, DM, and L2. This will energize headstock motor DM so long as brake time relay BTR remains in circuit-closing condition, which may involve a period of about three seconds. At an elapsed time of about three seconds, BTR will automatically open-circuit its contacts, and the current flow will then follow conductor 194 through micro-switches 134, 134, 134, 134 to maintain the motor circuit, provided, of course, that all the micro-switches 134 are closed.

Closing of the several micro-switches 134, as was previously explained, is dependent upon withdrawal of the brake shoes 80 to free the workpiece driving member or faceplate 18. If any one or more of the brake shoes fails to withdraw, the microswitch for that shoe will remain open-circuited and thereby terminate flow of current through conductor 194 which supplies current to drive motor DM. It is necessary, therefore, in order to sustain the circuit through drive motor DM, that all the micro-switches 134 close their contacts, and that the brake shoes associated therewith be withdrawn from braking position.

Withdrawal of the brake shoes as above recited, is dependent upon a timely shifting of valve 148 by brake release solenoid BR, incident to closing of the starter switch through relay BCR of said solenoid BR. If upon closing of the starter switch, the relay of solenoid BR fails to energize said solenoid, or said solenoid fails to shift the valve from the FIG. 10 position, valve 148 will remain in the position shown and so keep the brake shoes in braking engagement upon the faceplate. Under such circumstances, all of the micro-switches 134 will remain open-circuited, and will not pass current to drive motor DM when brake time relay BTR opens following its 3-second closing period.

Proper operation of the system will result if closing of the starter switch completes the motor circuit through time relay BTR, and if brake release solenoid BR promptly shifts the valve ports 174–176 into position for fluid-pressurizing the forward chambers 164 of the hydraulic cylinders 84. Such pressurizing of the hydraulic cylinders at 164 will effect release of the brakes, and consequent closing of the contacts of micro-switches 134 in readiness for maintaining the circuit through drive motor DM after timer BTR opens its contacts.

It is important to note that brake springs 114 will set or apply the brakes in the event of malfunction of the fluid pressure system to maintain pressure in either chamber of the hydraulic cylinders.

The clutch limit switch LSC and its associated relay LSR, form part of a circuit arrangement to control jogging of the drive motor DM, and to preclude energization of said motor unless clutch 38 is properly engaged. This phase of the control circuitry is of no concern to the present invention, and may properly be ignored in understanding the instant disclosure.

The means of the present invention is simple and reliable in operation, and assures immediate effective braking of the workpiece driving member or faceplate 18 whenever the turning operation is interrupted, either intentionally or accidentally. By so braking the workpiece at the faceplate or driving member, the workpiece has no opportunity to back away from the cutting tool and thereby tend to shock or fracture the tool upon resumption of the turning operation. In other words, the type of braking employed avoids retrogression of the workpiece and consequent loss of tool pressure at the cut being performed thereby. This is inducive to accurate shaping and high quality results, with a substantial extension of the cutting life of the tools employed, especially when the cut is stopped with the cutting tools still engaged in the cut.

It is to be understood that various modifications and changes may be made in the structural details of the device, within the scope of the appended claims, without departing from the spirit of the invention.

What is claimed is:

1. Apparatus for turning and shaping a heavy workpiece by means of a cutting tool applied thereto, and comprising in combination: a workpiece driving member; a prime mover including means for selectively starting and stopping rotation of said driving member and a workpiece fixed thereto; and releasable braking means operative upon the workpiece driving member during each stopping period, for immobilizing the workpiece relative to the cutting tool pending a re-starting of the driving member rotation; and means precluding sustained resumption of the driving member rotation upon failure of the braking means to release the driving member.

2. Apparatus for turning and shaping a heavy workpiece by means of a cutting tool applied thereto, and comprising in combination: a rotational workpiece driving member including a braking surface concentric with the axis of rotation of the driving member; a prime mover including means for selectively starting and stopping rotation of said driving member and a workpiece fixed thereto; a plurality of brake shoes movable radially of the braking surface of the driving member, between positions of engagement and disengagement relative to said driving member braking surface; and means precluding sustained resumption of driving member rotation by said prime mover, upon failure of any one or more of the brake shoes to disengage the braking surface of the driving member.

3. Apparatus as set forth in claim 2, wherein the engaging movements of the brake shoes upon the braking surface of the driving member, are directed in approximate diametrically opposite directions relative to the axis of rotation of the driving member.

4. Apparatus for turning and shaping a heavy workpiece by means of a cutting tool applied thereto, and comprising in combination: a rotational workpiece driving member including a braking surface concentric with the axis of rotation of the driving member; a prime mover including means for selectively starting and stopping rotation of said driving member and a workpiece fixed thereto; a stationary support, and a plurality of releasable braking means carried by the support, each including a movable brake shoe in position to engage and disengage the braking surface of the driving member; said braking means each including a double-acting hydraulic cylinder having a piston rod connected to a shoe, for moving the shoes as stated; fluid pressure means including a shiftable valve member for directing fluid to the cylinders in either of two directions, selectively, thereby to advance and retract the brake shoes in unison incident to selective shifting of the valve member; yielding means associated with each brake shoe tending to advance the shoes to braking position, the force of said yielding means being less than the force normally imposed by the hydraulic cylinders in retracting the brake shoes to disengaged position; an electric circuit for controlling operation of the prime mover, and including solenoid means alternately energizable for shifting the valve member to either of two positions, to actuate the hydraulic cylinders for advancing and retracting the brake shoes; a plurality of normally open-circuited electric switches series-connected in the circuit, said switches each being associated with a braking means and each including an actuator to be depressed only upon retraction of an associated shoe, to complete the electric circuit of the prime mover through all the switches only when all the shoes are retracted, thereby rendering sustained operation of the prime mover dependent upon a closed-circuit condition of all the switches aforesaid.

5. Apparatus for turning and shaping a heavy workpiece by means of a cutting tool applied thereto, and comprising in combination: a rotational workpiece driving member including a braking surface concentric with the axis of rotation of the driving member; a prime mover including means for selectively starting and stopping rotation of said driving member and a workpiece fixed thereto; a stationary support, and a plurality of releasable braking means carried by the support, each including a movable brake shoe in position to engage and disengage the braking surface of the driving member; said braking means each including a double-acting hydraulic cylinder having a piston rod connected to a shoe, for moving the shoes as stated; fluid pressure means including a shiftable valve member for directing fluid to the cylinders in either of two directions, selectively, thereby to advance and retract the brake shoes incident to selective shifting of the valve member; yielding means associated with each brake shoe tending to advance the shoes to braking position, the force of said yielding means being less than the force normally imposed by the hydraulic cylinders in retracting the brake shoes to disengaged position; an electric circuit for controlling operation of the prime mover, and including solenoid means alternately energizable for shifting the valve member to either of two positions, to actuate the hydraulic cylinders for advancing and retracting the brake shoes; a plurality of normally open-circuited electric switches series-connected in the circuit, said switches each being associated with a braking means and each including an actuator to be depressed only upon retraction of an associated shoe, to complete the electric circuit of the prime mover through all the switches only when all the shoes are retracted, thereby rendering sustained operation of the prime mover dependent upon a closed-circuit condition of all the switches aforesaid, a starting switch and a normally closed-circuit timer switch parallel-connected with the series switches aforesaid in the control circuit of the prime mover, said timer including means to maintain a closed-circuit condition of limited duration incident to momentary closing of the starting switch, whereby to limit energization of the prime mover in correspondency with the circuit-closing period of the timer switch, in the event of an open-circuit condition of any one of the series-connected switches controlled by the braking means.

6. Apparatus for turning and shaping a heavy workpiece by means of a cutting tool applied thereto, and comprising in combination: a rotational workpiece driving member including a braking surface concentric with the axis of rotation of the driving member; a prime mover adapted for selectively starting and stopping rotation of said driving member and a workpiece fixed thereto; a stationary support, and a plurality of releasable braking means carried by the support, each including a movable brake shoe in position to engage and disengage the braking surface of the driving member; said braking means each including a double-acting hydraulic cylinder having a piston rod connected to a shoe, for moving the shoes as stated; fluid pressure means including a shiftable valve member for directing fluid to the cylinders in either of two directions, selectively, thereby to advance and retract the brake shoes in unison incident to selective shifting of the valve member; an electric circuit for control of the prime mover, including solenoid means alternately energizable for shifting the valve member to either of two positions, for actuating the hydraulic cylinders to advance and retract the brake shoes correspondingly; a plurality of normally open-circuited electric switches series-connected in the circuit, said switches each being associated with a braking means and each including an actuator to be moved only upon retraction of an associated shoe, to complete the electric circuit of the prime mover through all the switches only when all the shoes are retracted, thereby rendering sustained operation of the prime mover dependent upon a closed-circuit condition of all the series-connected switches.

7. Apparatus for turning and shaping a heavy workpiece by means of a cutting tool applied thereto, and comprising in combination: a rotational workpiece driving member including a braking surface concentric with the axis of rotation of the driving member; a prime mover adapted for selectively starting and stopping rotation of said driving member and a workpiece fixed thereto; a stationary support, and a plurality of releasable braking means carried by the support, each including a movable brake shoe in position to engage and disengage the braking surface of the driving member; said braking means each including a double-acting hydraulic cylinder having a piston rod connected to a shoe, for moving the shoes as stated; fluid pressure means including a shiftable valve member for directing fluid to the cylinders in either of two directions, selectively, thereby to advance and retract the brake shoes in unison incident to selective shifting of the valve member; an electric circuit for control of the prime mover, including solenoid means alternately energizable for shifting the valve member to either of two positions, for actuating the hydraulic cylinders to advance and retract the brake shoes correspondingly; a plurality of normally open-circuited electric switches series-connected in the circuit, said switches each being associated with a braking means and each including an actuator to be moved only upon retraction of an associated shoe, to complete the electric circuit of the prime mover through all the switches only when all the shoes are retracted, thereby rendering sustained operation of the prime mover dependent upon a closed-circuit condition of all the series-connected switches, a starting switch and a normally closed-circuit timer switch parallel-connected with the series switches aforesaid in the circuit of the prime mover, said timer including means to maintain therein a closed-circuit condition of limited duration incident to momentary closing of the starter switch, whereby to limit energization of the prime mover in correspondency with the circuit-closing period of the timer switch, in the event of an open-circuit condition of any one of the series-connected switches controlled by the braking means.

8. Apparatus for turning and shaping a heavy workpiece by means of a cutting tool applied thereto, and comprising in combination: a rotational workpiece driving member including a braking surface concentric with the axis of rotation of the driving member; a prime mover adapted for selectively starting and stopping rotation of said driving member and a workpiece fixed thereto; a stationary support, and a plurality of releasable braking means carried by the support, each including a movable brake shoe in position to engage and disengage the braking surface of the driving member; said braking means each including a double-acting hydraulic cylinder having a piston rod connected to a shoe, for moving the shoes as stated; fluid pressure means including a shiftable valve member for directing fluid to the cylinders in either of two directions, selectively, thereby to advance and retract the brake shoes, in unison, incident to selective shifting of the valve member; and means operative upon failure of any one of the several brake shoes to retract, for precluding sustained rotation of the workpiece driving member by the prime mover.

9. Apparatus as set forth in claim 8, wherein the combination includes: yielding means associated with each brake shoe tending to advance the shoes to braking position independently of the hydraulic cylinder force of advancement, the force of said yielding means being inferior to the force normally imposed by the hydraulic cylinders in retracting the shoes to disengaged position.

10. Apparatus for turning and shaping a heavy workpiece by means of a cutting tool applied thereto, and comprising in combination: a rotational workpiece driving member including a braking surface; a prime mover adapted for selectively starting and stopping rotation of said driving member and a workpiece fixed thereto; a stationary support, and a plurality of releasable braking means carried by the support, each including a movable brake shoe in position to engage and disengage the braking surface of the driving member; said braking means each including a hydraulic cylinder having a piston rod connected to a shoe, for retracting the shoes from engaging position; fluid pressure means including a shiftable valve member for directing fluid to the cylinders simultaneously, to effect the said retraction of the brake shoes simultaneously; yielding means associated with each brake shoe to advance the shoes to braking position, the force of said yielding means being inferior to the force normally imposed by the hydraulic cylinders in retracting the shoes to disengaged position; and means operative upon failure of any one or more of the brake shoes to retract, for precluding sustained rotation of the workpiece driving member by the prime mover.

11. Apparatus as set forth in claim 10, wherein the workpiece driving member is in the form of a circular large-diameter faceplate, the braking surface of which is on the periphery thereof, and wherein the brake shoes are arranged in pairs operative to engage the braking surface substantially at opposite ends of a diameter of the driving member.

12. Apparatus for turning and shaping a workpiece by means of a cutting tool applied thereto, and comprising in combination: a rotational workpiece driving member in the form of a circular body having a peripheral braking surface concentric to the axis of rotation of said driving member; a stationary support, and a releasable braking means carried by the support; said braking means including a movable brake shoe in position to engage and disengage the braking surface of the driving member; a bracket fixed to the support, and including means to guide the brake shoe in moving toward and from the braking surface; a double-acting hydraulic cylinder including a piston rod arranged to move the shoe toward and from the braking surface incident to introduction of fluid under pressure to one end or the other of the hydraulic cylinder; and a pair of compression springs flanking the cylinder, said springs each having an end abutting the shoe, and an opposite end normally in fixed relation to the bracket, for constantly yieldingly urging the brake shoe toward engagement with the braking surface of the driving member, the force of said springs being inferior to the force normally imposed by the hydraulic cylinder in retracting the shoe to disengaged position.

13. Apparatus as set forth in claim 12, wherein the combination includes means for individually varying the compressive force of the springs.

14. Apparatus for turning and shaping a workpiece by means of a cutting tool applied thereto, and comprising in combination: a rotational workpiece driving member in the form of a circular body having a peripheral braking surface concentric to the axis of rotation of said driving member; a stationary support, and a releasable braking means carried by the support; said braking means including a movable brake shoe in position to engage and disengage the braking surface of the driving member; means on the support for guiding the brake shoe in its movements toward and from the braking surface; a double-acting hydraulic cylinder including a piston rod arranged to move the shoe toward and from the braking surface incident to introduction of fluid under pressure to one end or the other of the hydraulic cylinder, a compression spring having one end abutting the shoe, and an opposite end normally in fixed relation to the support, for constantly yieldingly urging the brake shoe toward engagement with the braking surface of the driving member, the force of said spring being normally inferior to the force normally imposed by the hydraulic cylinder in retracting the shoe to disengaged position; and means for varying the compressive force of the spring.

15. Apparatus as set forth in claim 14, wherein the combination includes adjustable means for limiting retractile movement of the shoe in the direction of brake disengagement.

References Cited by the Examiner

UNITED STATES PATENTS

| | | | |
|---|---|---|---|
| 1,303,607 | 5/1919 | Smith | 82—40 X |
| 2,149,940 | 3/1939 | Kylin | 82—28 X |
| 2,408,658 | 10/1946 | Kurzweil | 82—28 |
| 3,103,838 | 9/1963 | Beacom et al. | 82—28 |

FOREIGN PATENTS

| | | | |
|---|---|---|---|
| 1,118,571 | 11/1961 | Germany | 82—40 |

WILLIAM W. DYER, JR., *Primary Examiner.*

LEONIDAS VLACHOS, *Examiner.*